(12) United States Patent
Takada

(10) Patent No.: US 7,773,742 B2
(45) Date of Patent: Aug. 10, 2010

(54) ECHO CANCELLER

(75) Inventor: Masashi Takada, Yokohama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1044 days.

(21) Appl. No.: 10/578,323

(22) PCT Filed: Oct. 27, 2004

(86) PCT No.: PCT/JP2004/015890

§ 371 (c)(1),
(2), (4) Date: May 4, 2006

(87) PCT Pub. No.: WO2005/046077

PCT Pub. Date: May 19, 2005

(65) Prior Publication Data

US 2007/0058798 A1    Mar. 15, 2007

(30) Foreign Application Priority Data

Nov. 5, 2003    (JP)    ............................. 2003-376068

(51) Int. Cl.
*H04M 9/08* (2006.01)
*H04B 15/00* (2006.01)

(52) U.S. Cl. ........................... 379/406.08; 379/406.01; 381/93

(58) Field of Classification Search ......... 370/282–286; 381/66, 93, 94.1, 94.3; 379/406.01–406.16; 455/570

See application file for complete search history.

(56) References Cited

U.S. PATENT DOCUMENTS

| 5,940,499 | A  | * | 8/1999  | Fujii et al.  | 379/388.05 |
| 6,408,070 | B2 | * | 6/2002  | Farra         | 379/406.01 |
| 6,816,591 | B2 | * | 11/2004 | Terada et al. | 379/406.01 |
| 6,876,751 | B1 | * | 4/2005  | Gao et al.    | 381/318    |
| 6,901,143 | B1 | * | 5/2005  | Ono           | 379/414    |

(Continued)

FOREIGN PATENT DOCUMENTS

JP    01198154 A    8/1989

(Continued)

OTHER PUBLICATIONS

Hideki Nomoto et al.—"A Study on the Bias Compensation and Variable Step Size Algorithms for the Filtered-X"; Technical Report of IEICE., DSP 97-14, May 1997, pp. 47-54.

(Continued)

*Primary Examiner*—Curtis Kuntz
*Assistant Examiner*—Mohammad K Islam
(74) *Attorney, Agent, or Firm*—Venable LLP; Michael A. Satori; Todd R. Farnsworth

(57) ABSTRACT

There is provided an echo canceller which can appropriately cancel an echo even when a low-frequency component is included in the signal to be passed. The echo canceller includes an echo replica forming means for forming an echo replica signal from a far-end input signal by using an adaptive filter including a filter section and a coefficient update section, and an echo cancellation means for removing an echo component in a near-end input signal by subtracting the echo replica signal from the near-end input signal. The echo canceller further includes an offset removal means for removing an offset component produced under an effect of low frequencies from the filter coefficient of the adaptive filter.

4 Claims, 7 Drawing Sheets

U.S. PATENT DOCUMENTS

2004/0001450 A1* 1/2004 He et al. .................... 370/286
2007/0092074 A1* 4/2007 Takada ................. 379/406.08

FOREIGN PATENT DOCUMENTS

| JP | 10-501951 | 2/1998 |
| JP | 2002094419 A | 3/2002 |
| JP | 2002-526961 | 8/2002 |
| WO | WO 96/32776 | 10/1996 |
| WO | WO 00/19605 | 4/2000 |

OTHER PUBLICATIONS

Hideki Nomoto et al. "A Study on the Bias Compensation and Variable Step Size Algorithms for the Filtered-X"; Technical Report of IEICE., DSP 97-14, May 1997, pp. 47-54.

* cited by examiner

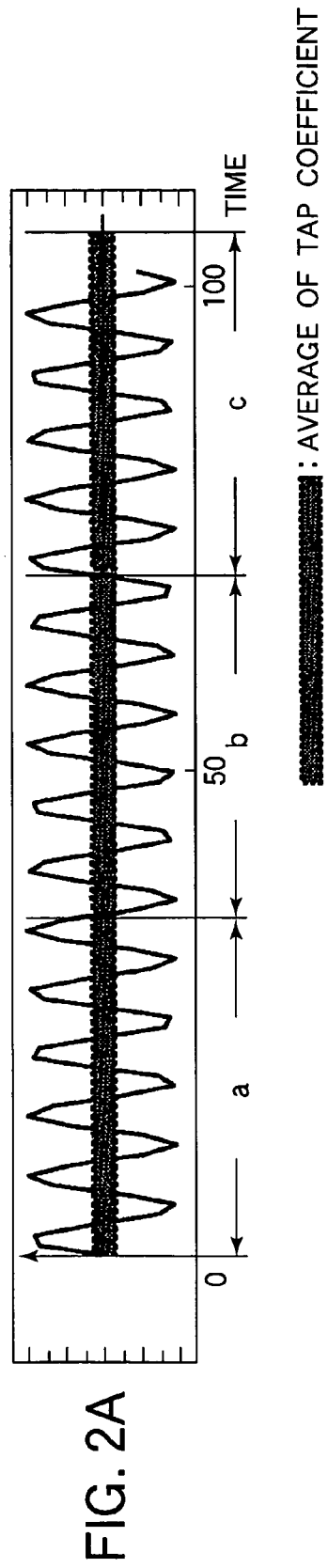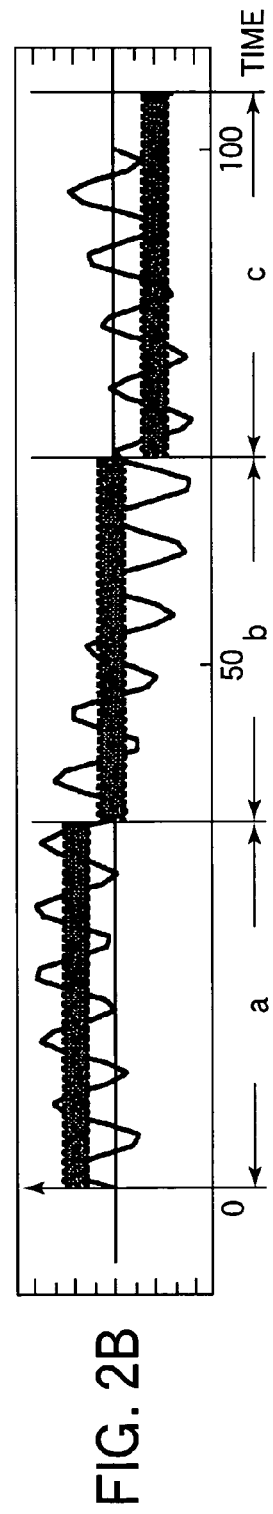
FIG. 2A
FIG. 2B

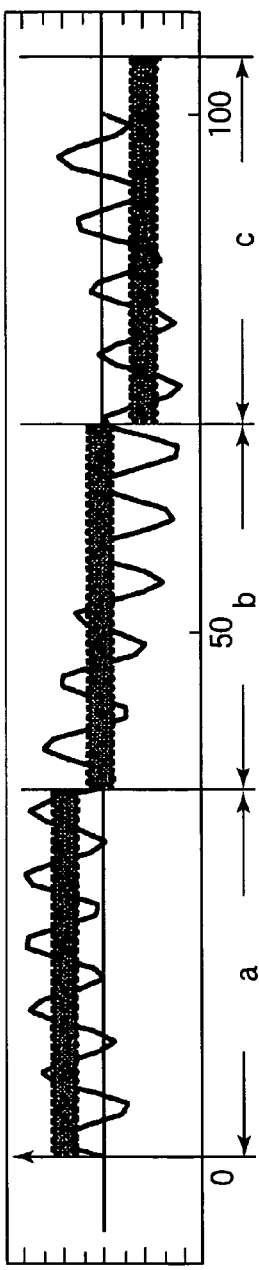
FIG. 4A
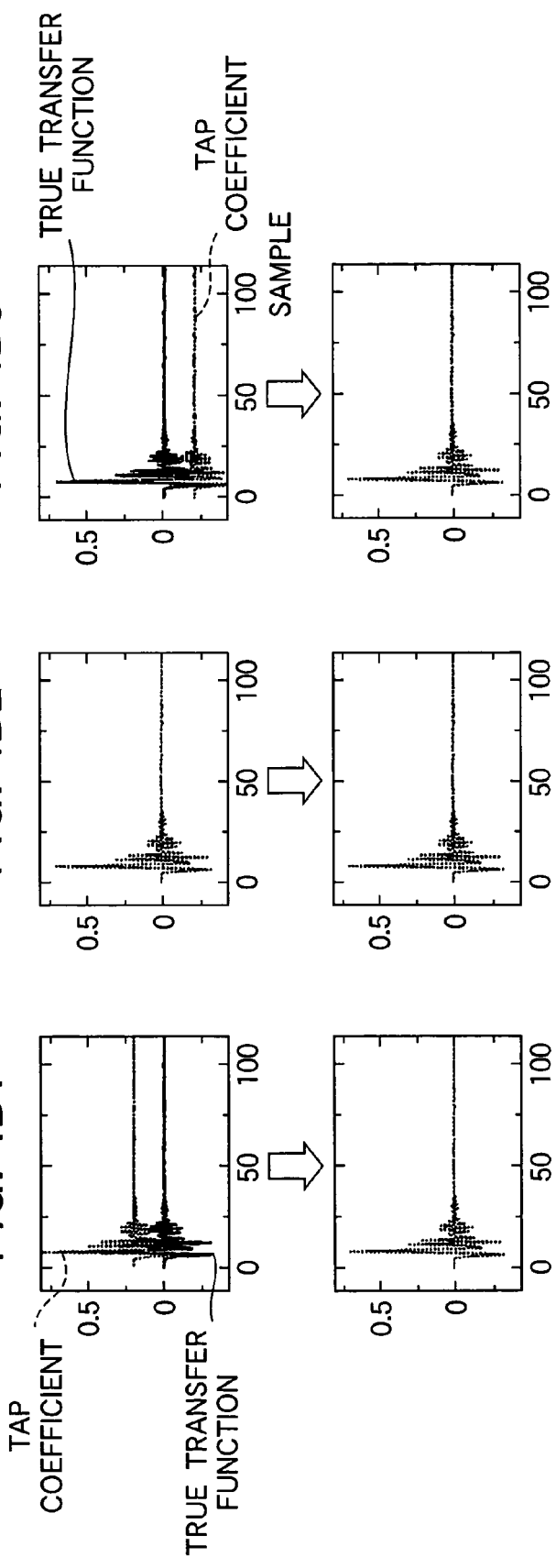
FIG. 4B1　FIG. 4B2　FIG. 4B3
FIG. 4C1　FIG. 4C2　FIG. 4C3

US 7,773,742 B2

ECHO CANCELLER

TECHNICAL FIELD

The present invention relates to an echo canceller, and, for example, is suitable for applying to an echo canceller which removes a line echo occurring in a hybrid circuit used in broadband voice telephony.

BACKGROUND ART

It is known that the echo canceller forms an echo replica signal by using an adaptive filter and removes an echo component from a near-end input signal by the echo replica signal. The echo canceller also causes the filter coefficient of an adaptive filter to be updated and to converge on a predetermined algorithm (e.g., LMS) to form an appropriate echo replica signal. A higher convergence speed of the filter coefficient is preferable because the time for forming an appropriate echo replica signal is reduced.

In general, a control is made so that the filter coefficient is updated in accordance with a far-end input signal and a near-end input signal after echo component cancellation. It is conventionally known that noise such as a bias (DC offset) in a far-end input signal makes it impossible to update the filter coefficient, thereby degrading the echo cancellation capability.

A non-patent document 1 discloses technologies related to active noise control instead of the echo canceller. It seems that the technologies are related to bias compensation of the adaptive filter and can be applied to the echo canceller.

Non-patent document 1: Nomoto, et al., "A Study on the Bias Compensation and the Variable Step Size Algorithms for the Filtered-X", Technical Report of IEICE, DSP97-14 (1997-05)

DISCLOSURE OF INVENTION

Problem To Be Solved By The Invention

However, the technology described in non-patent document 1 has the following problems.

1. Since the calculation for removing the bias for a desired signal is performed for each sample, a large amount of calculation processing is required.

2. It is assumed that a bias component (the technology described in non-patent document 1 takes not only a direct-current component but also a gently varying component as the above-mentioned bias component) in a desired signal is always caused by noise, and the bias component is directly removed from the desired signal. Therefore, if this technology is used for communication, any necessary low-frequency component, which varies gently, in a desired signal is removed as a bias component, thereby adversely affecting the sound quality.

In view of the foregoing, it is an object of the present invention to provide an echo canceller which involves small amounts of computations, reduces the scale of hardware and the scale of software, and provides a high sound quality without degrading the components of the signal to be passed even if a low-frequency component is included in the signal to be passed.

Means For Solving The Problem

In order to solve the above mentioned problems, an echo canceller according to the present invention includes: an echo replica forming means for forming an echo replica signal from a far-end input signal by using an adaptive filter including a filter section and a coefficient update section; an echo cancellation means for removing an echo component in a near-end input signal by subtracting the echo replica signal from the near-end input signal; and an offset removal means for removing an offset component produced under an effect of low frequencies from the filter coefficient of the adaptive filter.

Effects of the Invention

An echo canceller which can be implemented according to the present invention involves small amounts of computations, can reduce the scale of hardware and the scale of software, and can appropriately remove echo even if a signal to be passed contains a low-frequency component.

BRIEF DESCRIPTION OF THE DRAWINGS

FIGS. 2A and 2B are diagrams (No. 1) for describing the reason why an offset removal section for removing an offset of a tap coefficient is provided in the first embodiment;

FIGS. 3A and 3B1 to 3B3 are diagrams (No. 2) for describing the reason why the offset removal section for removing the offset of the tap coefficient is provided in the first embodiment;

FIGS. 4A, 4B1 to 4B3, and 4C1 to 4C3 are diagrams (No. 3) for describing the reason why the offset removal section for removing the offset of the tap coefficient is provided in the first embodiment;

EXPLANATION OF THE REFERENCE MARKS 8 adder; 10 double talk detector; 11 coefficient update section; 12 filter section; 13, 22 offset removal section; 14, 14A, 14B, 14C echo canceller; 15, 45 adaptive filter; 16 counter; 20 sending-side FFT section; 21 receiving-side FFT section; 30, 40 sending-side low-pass filter section; 31, 41 receiving-side low-pass filter section.

BEST MODE FOR CARRYING OUT THE INVENTION (A) First Embodiment An echo canceller applied for removing a line echo according to the first embodiment of the present invention will next be described in detail with reference to drawings.

(A-1) Configuration of First Embodiment

Figure 1:
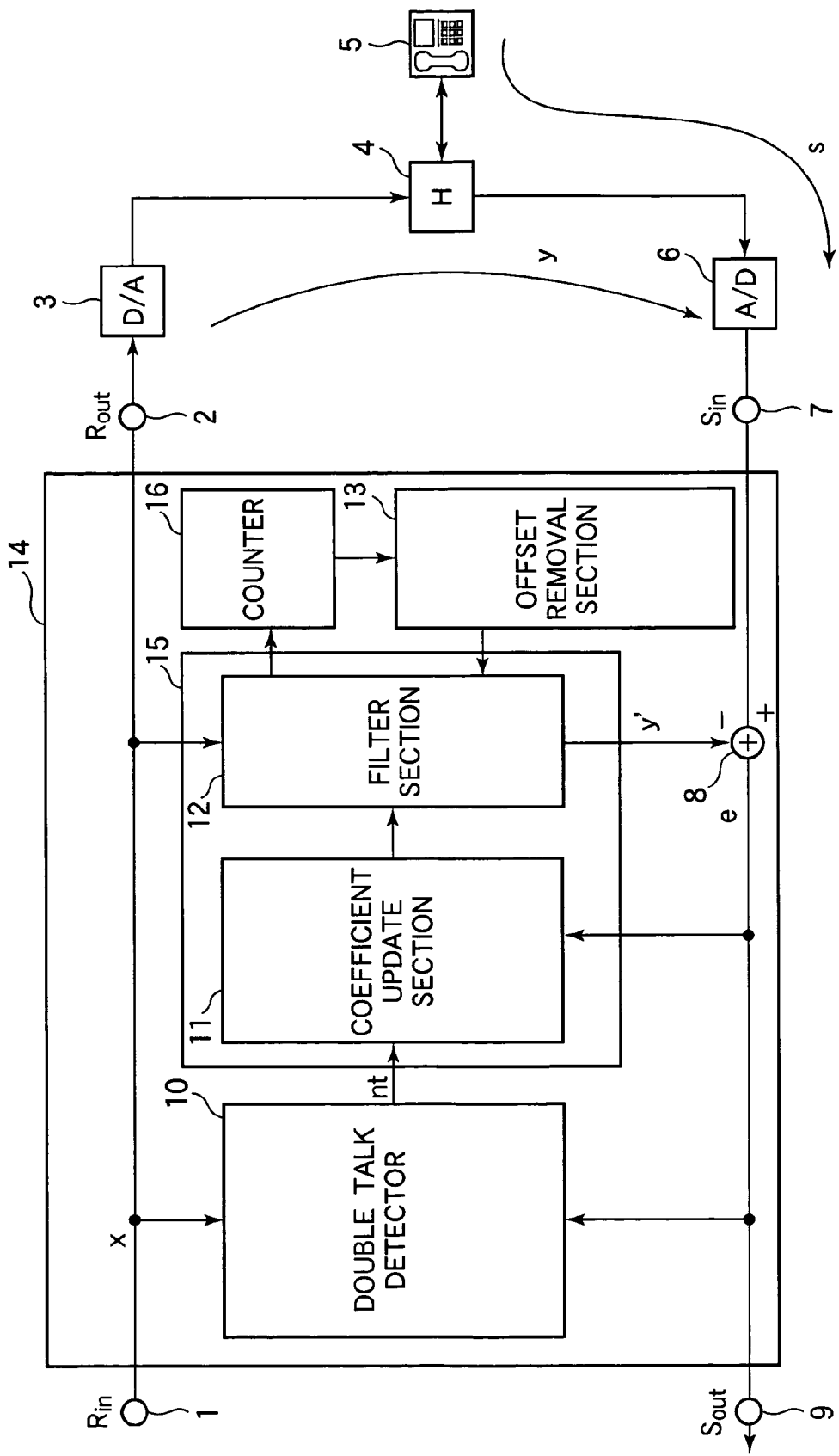
FIG. 1 is a block diagram showing a configuration of an echo canceller of the first embodiment.

FIG. 1 is a block diagram showing a configuration of the echo canceller of the first embodiment. Referring to FIG. 1, an echo canceller 14 of the first embodiment includes an input terminal 1 of a digital audio signal $R_{in}$ from a talker at a remote end (hereafter referred to as a far end, not shown), an output terminal 2 for outputting an audio signal $R_{out}$ from the far end to a receiver (hereafter referred to as a near end), an input terminal 7 of a signal $S_{in}$ from the near end, and an output terminal 9 of a signal $S_{out}$ to the far end.

The signal $R_{out}$ from the output terminal 2 of the echo canceller 14 is converted to an analog signal by a digital-to-analog converter 3, and then the signal is given through a hybrid circuit 4 to a telephone set 5. An audio signal from the telephone set 5 passes the hybrid circuit 4 and an analog-to-digital converter 6, and enters the input terminal 7 of the echo canceller 14. A part of the signal $R_{out}$ from the output terminal 2 passes the hybrid circuit 4 as it is and directly goes to the input terminal 7, and the echo canceller 14 removes the echo component.

The echo canceller 14 includes an adder 8, a double talk detector 10, a coefficient update section 11, a filter section 12, an offset removal section 13, and a counter 16. The coefficient update section 11 and the filter section 12 form an adaptive filter 15.

In the first embodiment, the offset removal section 13 and the counter 16 are added to the general configuration, and accordingly, the filter section 12 is different in some degree.

The functions of the filter section 12, the offset removal section 13, and the counter 16 will be described in the following description of the operation.

(A-2) Operation of First Embodiment

The operation of the echo canceller 14 of the first embodiment will next be described. In the subsequent explanation, the telephone set 5 is assumed to be an IP telephone set, which has sprung into wide use in recent years, for example. Unlike the conventional telephone set, the IP telephone set is not assigned a limited frequency band of the audio signal.

For example, the audio signal of the conventional fixed telephone is assigned a limited frequency band of 300 to 3400 Hz (hereafter, this signal is referred to as the conventional band signal). However, since the audio signal of the IP telephone set is not assigned a limited frequency band of 300 to 3400 Hz, a signal of a wider frequency band can be received and sent. The international standard ITU-T G.722 specifies a speech coding technique for communication in a band of 50 to 7000 Hz. This technique widens the frequency coverage and allows an audio signal having a high sound quality to be transferred. For example, the first embodiment shows an example handling a signal of 20 to 7000 Hz (hereafter referred to as a broad-band signal). Of course, the frequency band is not limited to this range.

A broad-band signal $R_{in}$ input to the far-end input terminal 1 shown in FIG. 1 is supplied to the double talk detector 10, the filter section 12, and the far-end output terminal 2. The functions of the double talk detector 10 and the filter section 12 will be described later. A signal $R_{out}$ output from the far-end output terminal 2 is converted to an analog signal by the digital-to-analog converter 3, and the signal is output to the telephone set 5. In the meantime, a part of the signal $R_{out}$ output from the far-end output terminal 2 is reflected by the hybrid circuit 4, converted to a digital signal Sin by the analog-to-digital converter 6, and input to the near-end input terminal 7. The signal $S_{in}$ input to the near-end input terminal 7 is converted to a signal $S_{out}$ after echo cancellation, and sent through the near-end output terminal 9 to the talker at the far end. When the output signal $R_{out}$ of the far-end output terminal 2 is input to the near-end input terminal 7, the talker, which is not shown, at the far end hears his or her own voice as an echo component y, interfering with the conversation. The echo canceller 14 is provided to remove the echo component y.

In the echo canceller 14, the signal $S_{in}$ containing the echo component y is input from the near-end input terminal 7 and enters the adder 8. The adder 8 subtracts an echo replica signal (pseudo-echo signal) y', which has been created by the adaptive filter 15 as described later, from the signal $S_{in}$. The signal $S_{out}$ (e), from which the echo has been removed by the adder 8, is output to the output terminal 9 to the talker at the far end. The signal $S_{out}$ is routed through a path such as an IP network and output toward the telephone set of the talker at the far end, which is not shown. Thus, the signal, from which the echo has been removed, reaches the talker at the far end.

The method of creating the echo replica signal y' will next be described. An algorithm for generating an echo replica signal in the first embodiment is a known normalized least mean square algorithm. Of course, another appropriate echo replica signal creation algorithm can be used.

As described earlier, the coefficient update section 11 and the filter section 12 form the adaptive filter 15. The operation of the adaptive filter 15 will be described first. The signal $R_{in}$ input from the far-end input terminal 1 enters the filter section 12. The filter section 12 is a known FIR (finite impulse response) filter. The tap coefficient of the adaptive filter 15 is updated over time as described later.

Suppose that the m-th tap coefficient of the filter section 12 at time k is h(k,m). The value of the signal $R_{in}$ from the far-end input terminal 1 at time k is expressed as x(k). The filter section 12 creates the echo replica signal y' as given by expression (1). A symbol M represents the number of taps of the filter section 12, which can be 256, but is not limited to 256. As indicated by expression (1), the echo replica signal y' is formed by a product-sum operation of the data of the past M samples of x(k) and the tap coefficient.

$$y' = \sum_{m=0}^{M-1} h(k, m) \cdot x(k - m) \tag{1}$$

The tap coefficient of the filter section 12 is updated as given by expression (2) in preparation for next filtering. The initial values of h and x in expression (2) are 0. Further, μ denotes a constant for determining the tracking speed of the echo canceller 14 ($0 \leq \mu \leq 1$). The value of μ can be 0.5, for example, but the value is not limited to 0.5. When the tracking speed determination constant μ increases, the tracking speed of the echo canceller 14 increases, but the echo cancellation capability is degraded in a steady state. On the other hand, when the tracking speed determination constant μ decreases, the echo cancellation capability of the echo canceller 14 is improved in a steady state, but the tracking speed decreases.

$$h(k+1, m) = h(k, m) + \mu \frac{e(k) \cdot y(k)}{\sum_{i=0}^{M-1} x^2(k-i)} \tag{2}$$

e(k) in expression (2) denotes the output of the adder 8 (a residual of the echo subtraction). With y (k) and y' (k) denoting the echo component y and the echo replica signal y' at time k respectively, expression (3) is given as follows:

$$e(k) = y(k) - y'(k) \tag{3}$$

As mentioned above, tap coefficient control in accordance with expressions (2) and (3) uses the known "normalized least mean square algorithm." It is a known fact that the tap coefficient h(k,m) is updated in such a manner that the residual of echo subtraction e(k) (or its power) in expression (3) gradually approaches 0. The tap coefficient is updated (the filter converges) in such a manner that the echo component y is gradually reduced by the adder 8. The characteristics of the hybrid circuit 4, which is an echo path, are estimated by the tap coefficient of the filter section 12, and the echo component y is removed. If a near-end talker signal s is also input to the near-end input terminal 7, the right-hand side of expression (3) becomes as shown in expression (4), which includes the near-end talker signal s, and the tap coefficient cannot be updated correctly. In expression (4), s(k) denotes the value of the near-end talker signal at time k.

$$e(k)=y(k)-y'(k)+s(k) \quad (4)$$

Therefore, if there is a near-end talker signal as in expression (4), a coefficient update must be stopped. The double talk detector 10 detects a status as indicated by expression (4) or the like.

The double talk detector 10 receives the output signal x(k) from the far-end input terminal 1 and the output e(k) from the adder 8. The smoothed value of the power of the signals is obtained in accordance with expressions (5) and (6).

$$\text{pow\_}x(k)=\text{pow\_}x(k-1)\cdot\delta+x^2\cdot(1-67) \quad (5)$$

$$\text{pow\_}e(k)=\text{pow\_}e(k-1)\cdot\delta+e^2\cdot(1-67) \quad (6)$$

A constant $\delta$ represents the degree of smoothness (1>$\delta$>0). If the smoothness constant $\delta$ is large, general variations in the signals x and e are reflected, and the effect of noise decreases. If the smoothness constant $\delta$ is small, steep changes in the signals x and e are correctly reflected, and the effect of noise increases. For example, $\delta$ can be 0.5, but $\delta$ is not limited to 0.5.

The double talk detector 10 detects the presence or absence of the signals (talkspurt or silence) from the smoothed values of power pow_x(k) and pow_e(k) by a method as described later. When a signal is found only on the side of the signal path from the far-end input terminal 1 to the far-end output terminal 2, the coefficient of the adaptive filter 15 is updated. Otherwise, the double talk detector 10 outputs a signal nt for stopping a coefficient update to the coefficient update section 11.

The double talk detector 10 determines whether a signal exists or not, as follows. When condition 1 is satisfied, the double talk detector 10 outputs nothing to the coefficient update section 11 and allows a coefficient update.

Condition 1:
pow_x(k)>(silence threshold value), and
pow_x(k)>pow_e(k)+(margin value)
(silence threshold) can be −38 dBm, and (margin value) can be 6 dB, for example, but (silence threshold) and (margin value) are not limited to these values.

When condition 1 is not satisfied, it is determined that
1. the near-end input signal 7 has an input signal;
2. the far-end input terminal 1 has no input signal;
3. both the far-end input terminal 1 and the near-end input signal 7 have no input signal; or
4. both the far-end input terminal 1 and the near-end input signal 7 have an input signal.

Then, a coefficient update stop signal nt is output to the coefficient update section 11. When the coefficient update stop signal nt is given, the coefficient update section 11 does not perform a coefficient update indicated by expression (2).

As has been described above, the double talk detector 10 does not update the coefficient in a state indicated by expression (4) (double-talk state). Further, if the far-end input terminal 1 has no signal, no echo occurs, and the coefficient is not updated. Accordingly, the coefficient is updated in the state indicated by expression (3). The coefficient of the filter section 12 can be correctly converged by a known normalized least mean square algorithm. In the description given above, the double talk detector 10 detects talkspurt or silence of the input signal to the far-end input terminal 1 and talkspurt or silence of the input signal to the near-end input terminal 7, by using the smoothed values of power of x(k) and e(k). Another appropriate method that can detect at least silence of the input signal to the far-end input terminal 1 and talkspurt of the input signal to the near-end input terminal 7 (near-end talker) can be used.

The function and operation of the offset removal section 13 representing the characteristics of the echo canceller 14 of the first embodiment will next be described.

It is conventionally known that a direct-current offset added to the input signal degrades the echo cancellation capability of the echo canceller. This offset component has been believed to be caused by just the characteristics of the analog-to-digital converter 6 or the background noise of the near-end input terminal 7.

When communication is constantly performed in a wide frequency band, such as by the broad-band telephone set, it has been found that the echo canceller is affected by the offset component or a component assumed to be an offset even without the effect of the background noise or analog-to-digital converter. This phenomenon will be described with reference to FIGS. 2A and 2B.

In the conventional general telephone communication, the frequency band of the audio signal is limited to 300 to 3400 Hz. The lower limit of the frequency band is about 300 Hz. Further, the conventional telephone set generally uses a sampling frequency of 8000 Hz. In the conventional art, the frequency that can be reproduced by the FIR filter described above is limited. The upper limit is a half of the sampling frequency, i.e., 4000 Hz, on the basis of a known sampling theorem. The lower limit depends on the tap length of the FIR filter. With a sampling frequency of 8000 Hz and an echo canceller with a tap length of 256, the FIR filter can express the waveform of up to one cycle. That is, the lowest frequency that can be expressed by the filter is 1/(256×(1/8000))=31.25 Hz.

Since the lowest frequency of the input signal of the conventional telephone set is 300 Hz, the echo canceller can represent the signal sufficiently. Accordingly, the tap coefficient of the filter of the echo canceller is not affected by a low-frequency offset. This state is shown in FIG. 2A.

Broad-band communication will next be described. Suppose that the sampling frequency is 16 kHz. If the echo canceller has a tap length of 256 like the one described earlier, the lowest frequency that can be expressed by the echo canceller is 1/(256×(1/16000))=62.5 Hz.

The filter section 12 of the echo canceller cannot express a frequency component below the lowest frequency because the length of one cycle exceeds the filter tap length. The broad-band telephone set often uses a low-frequency component of 20 Hz to 50 Hz for communication, but the FIR filter of the echo canceller cannot express low frequencies of the broad-band telephone communication.

A simple solution to this problem is to increase the tap length of the echo canceller to expand the frequency range that can be expressed by the FIR filter (lower the frequencies that can be expressed). An increased filter tap length, however, increases an amount of product-sum operations. As a result, when the echo canceller is implemented by a digital signal processor, for example, increased amounts of operations, increased hardware scale, and other adverse effects cannot be avoided. If a filter that can express a frequency of up to 20 Hz is desired at a sampling frequency of 16 kHz, an impractically huge filter with a tap length of 800 would be required. If the input contains a frequency component that is too low to express, the echo canceller is affected by the low-frequency component that cannot be expressed and behaves as if different offsets are applied in the time segments "a" to "c", as shown in FIG. 2B. Then, a corresponding offset occurs, and the average of the tap coefficient does not become zero as if the offset is superimposed (the offset exists).

Figure 3A:
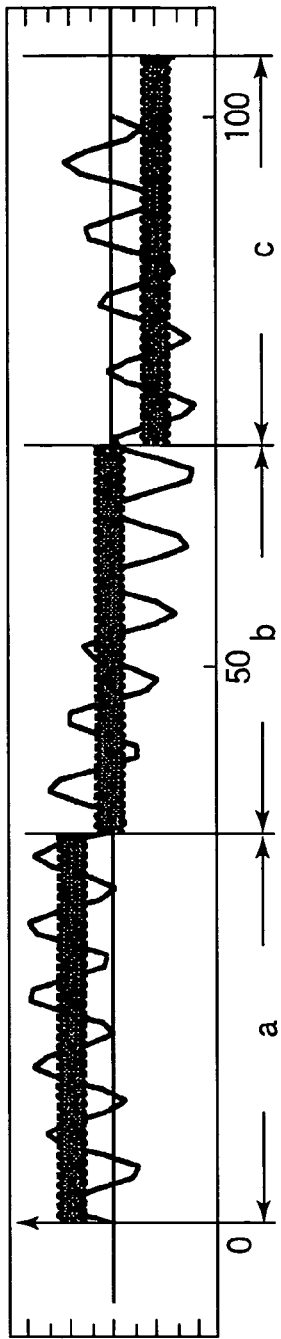
Figure 3A:
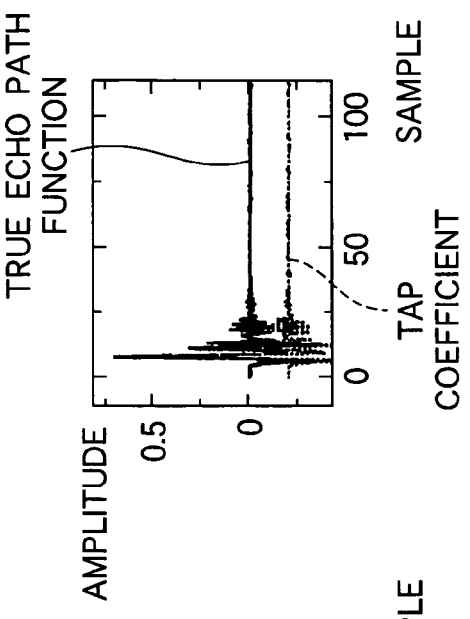
Figure 3A:
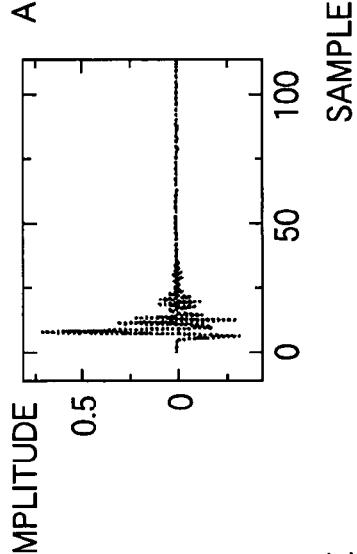
Figure 3A:
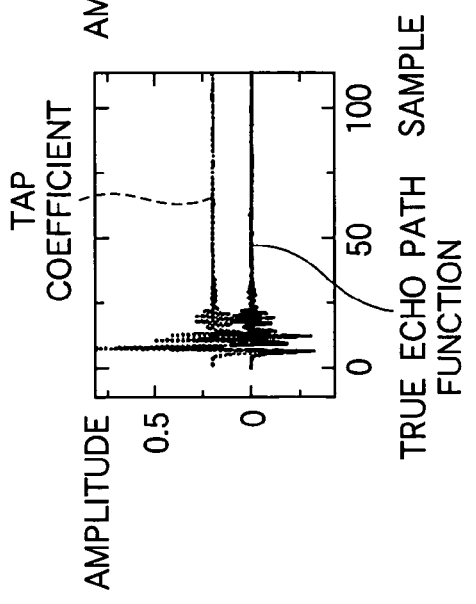

The echo canceller primarily converges the tap coefficient to represent the transfer function of the echo path directly. In broad-band telephone communication, an offset of the tap coefficient makes it impossible for the echo canceller to converge to the true essential transfer function. FIGS. 3A and 3B1 to 3B3 show the tap coefficient and the true transfer function of the echo path when there is an offset. FIG. 3A shows the mean values of the tap coefficients in the time segments "a" to "c". FIGS. 3B1 to 3B3 show the converged tap coefficient of time segments "a" to "c". In time segment "b", the low frequency crosses the level of zero, and no offset appears to exist in time segment "b". As shown in FIGS. 3A and 3B1 to 3B3, a mismatch between the transfer function of the true echo path and the estimated tap coefficient degrades the echo cancellation capability greatly.

Therefore, in the first embodiment, the offset removal section 13 and the counter 16 are provided. The offset removal section 13 and the counter 16 remove the offset of the tap coefficient, as described below.

The echo canceller 14 performs echo cancellation each time a new sample x(k) is input to the far-end input terminal 1, as indicated by expression (3) above. The counter 16 counts that the creation of an echo replica signal (accordingly, echo cancellation) is repeated for each of the samples input from the adaptive filter 15. The counter 16 outputs a signal indicating that the processing for the n samples has finished to the offset removal section 13.

That is, this signal is output for every n samples.

The offset removal section 13 receives the n-sample timing signal from the counter 16 and performs offset removal in accordance with expression (7). The second term in the right-hand side of expression (7) represents the offset component to be removed. Expression (7) indicates that the offset is removed from the m-th tap coefficient at time k+1, i.e., h(k+1,m) given by expression (2). The offset is obtained as the mean value of the M tap coefficients at time k+1 obtained by calculation.

$$h(k+1, m) = h(k+1, m) - \frac{1}{M}\sum_{i=0}^{M-1} h(k+1, i) \quad (7)$$

The offset removal section 13 may remove offset in accordance with expression (8), instead of expression (7). The offset calculation of expression (8) differs from that of expression (7). In expression (7), the mean value of the M tap coefficients is calculated as a common offset for all the taps. In expression (8), an average on the time base is calculated as an offset for each tap of the tap coefficient. The offset may also be calculated from the mean value on the time base and the tap position.

$$h(k+1, m) = h(k+1, m) - \frac{1}{n}\sum_{i=0}^{n-1} h(k+i, m) \quad (8)$$

Expression (7) or (8) for removing the offset component may not be carried out at the timing of h(k+1,m) and may be carried out at the timing of h(k,m), of course. The value of n can be 160, for example, but the value is not limited to 160. If 160 data samples of the far-end input terminal 1 and the near-end input terminal 7 are processed as a single frame, specifying the value of n to 160 is convenient. The value of n may also be specified to the filter length (256, for example), of course.

Actually, the offset removal as described above should be executed once for the number of samples, which is equal to the shortest tap length. The offset removal does not need to be executed for each sample. Then, the tap coefficient is updated in accordance with expression (2), and the offset removal executed once will be reflected continuously. In the first embodiment, a bias signal (offset signal) is not directly removed from the input signal $S_{in}$ to the near-end input terminal 7. This is a difference from the method described in the non-patent document 1.

FIGS. 4A, 4B1 to 4B3, and 4C1 to 4C3 (especially, FIGS. 4C1 to 4C3) show the states shown in FIGS. 3A and 3B1 to 3B3 and the correction of a low-frequency offset in segments "a" to "c". In segment "a", the positive offset of the tap coefficient is corrected to 0. In segment "c", the negative offset of the tap coefficient is corrected to 0.

(A-3) Effects of First Embodiment

The offset of the tap coefficient is removed in each segment, as described above, so that the echo component can be efficiently removed even when a broad-band communication signal is used, thereby saving the amounts of operations and giving no effect other than echo cancellation to the transmission signal (near-end voice signal). The saved amounts of operations mean an increased processing speed if the echo canceller is implemented by software utilizing a DSP or mean a reduced device scale if the echo canceller is implemented by hardware.

(B) Second Embodiment

Figure 5:
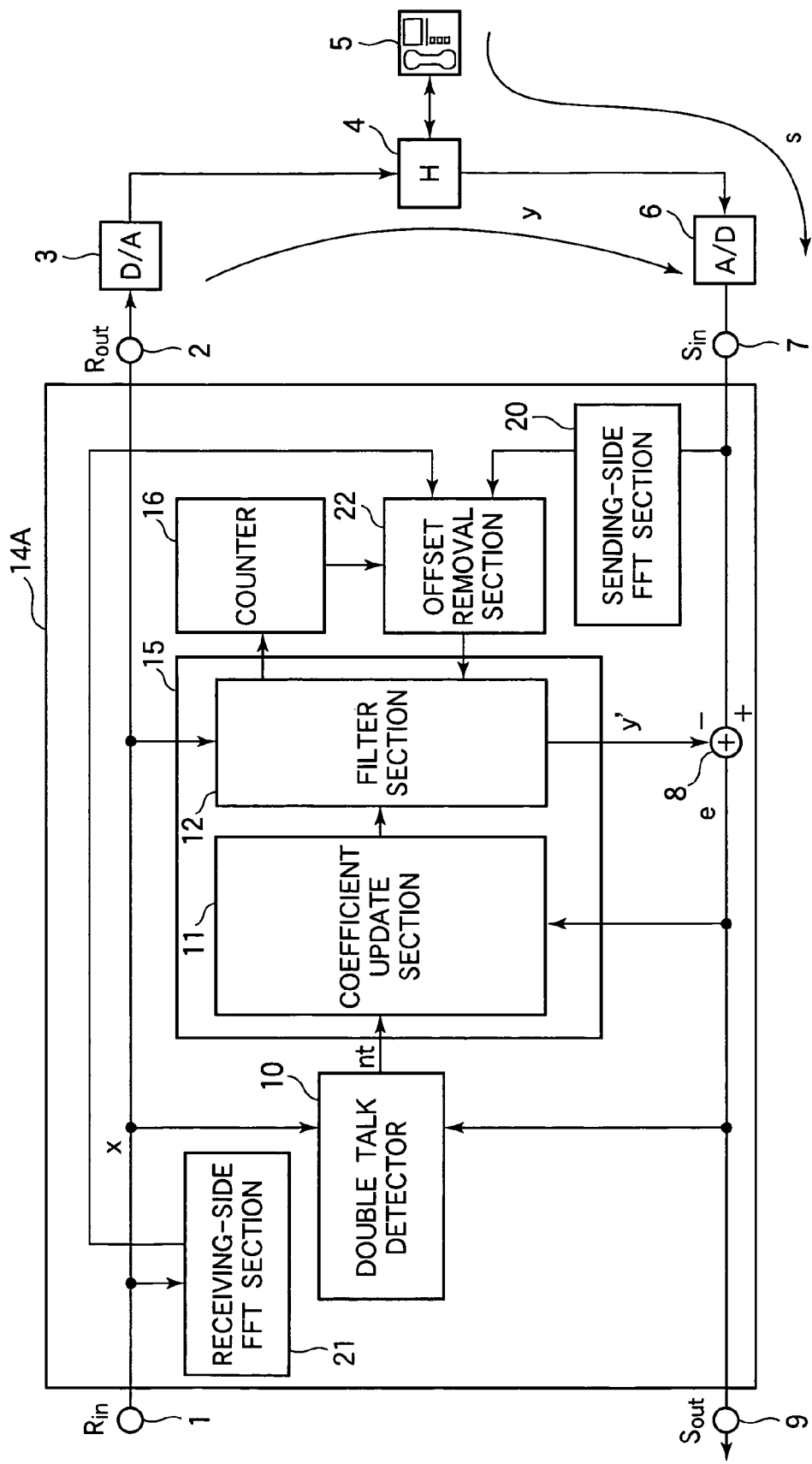
FIG. 5 is a block diagram showing a configuration of an echo canceller of the second embodiment.

An echo canceller for removing a line echo according to the second embodiment of the present invention will next be described in detail with reference to drawings. FIG. 5 is a block diagram showing a configuration of an echo canceller 14A of the second embodiment and a peripheral configuration. Elements identical to those in the first embodiment shown in FIG. 1 are denoted by the same reference marks.

As a comparison between FIG. 5 and FIG. 1 clearly shows, the echo canceller 14A of the second embodiment has a sending-side FFT section 20 for performing a frequency analysis of the signal $S_{in}$ input from the near-end input terminal 7 and giving the result to the offset removal section 22 and a receiving-side FFT section 21 for performing a frequency analysis of the signal $R_{in}$ input from the far-end input terminal 1 and giving the result to the offset removal section 22, in addition to the elements of the first embodiment. Accordingly, the function of the offset removal section 22 differs a little from the function of the offset removal section 13 of the first embodiment.

A precondition for the first embodiment is that a call is made between broad-band telephone sets.

However, a call between the near end and the far end can be made between a broad-band telephone set and a telephone set having the conventional band (conventional telephone set). The echo canceller 14A of the second embodiment has the same effects as described in the first embodiment even if the echo canceller is placed between unknown types of telephone sets at the near end and the far end, such as when a call is made between the conventional telephone set and a broad-band telephone set or between the conventional telephone sets. The offset of the low-frequency component unique to the broadband telephone signal is removed appropriately according to the telephone type.

First, the operation of the echo canceller 14A of the second embodiment when a broad-band telephone set is used at the far end and the conventional telephone set 5 is used at the near end will be described.

The signal $R_{in}$ input from the far-end input terminal 1 is supplied to the receiving-side FFT section 21. The receiving-side FFT section 21 performs a frequency analysis of the input signal and detects the presence or absence of either or both of a component of up to 300 Hz and a component of not less than 3400 Hz. The presence or absence of the component can be detected by checking whether a power spectrum obtained as a result of FFT exceeds a level of −30 dBm, for example. If a component of up to 300 Hz and/or a component of not less than 3400 Hz is found (both or either of the conditions can be used), the receiving-side FFT section 21 outputs an offset removal execution signal to the offset removal section 22, considering that a broad-band telephone set is connected to the far end. When the offset removal execution signal is input from either the receiving-side FFT section 21 or the sending-side FFT section 20, the offset removal section 22 performs offset removal, as in the first embodiment. If the offset removal execution signal is given from the receiving-side FFT section 21, offset removal is executed. The operation does not depend on whether the sending-side FFT section 20 gives an offset removal execution signal.

Next, the operation of the echo canceller 14A of the second embodiment when the conventional telephone set is used at the far end and the broad-band telephone set is used at the near end will be described.

The signal $S_{in}$ input from the near-end input terminal 7 is supplied to the sending-side FFT section 20. The sending-side FFT section 20 performs a frequency analysis of the input signal and detects the presence or absence of both or either a component of up to 300 Hz and a component of not less than 3400 Hz. The presence or absence of the component can be detected by checking whether a power spectrum obtained as a result of FFT exceeds a level of −30 dBm, for example. If a component of up to 300 Hz or a component of not less than 3400 Hz is found (both or either of the conditions can be used), the sending-side FFT section 20 outputs an offset removal execution signal to the offset removal section 22 because a broad-band telephone set is connected at the near end. The offset removal section 22 executes offset removal as in the first embodiment because the offset removal execution signal is input from the sending-side FFT section 20. The operation does not depend on whether the receiving-side FFT section 21 gives the offset removal execution signal.

The operation of the echo canceller 14A of the second embodiment when the conventional telephone sets are used at both the far end and the near end will be described.

Both the sending-side FFT section 20 and the receiving-side FFT section 21 output no offset removal execution signal to the offset removal section 22 because the signal subjected to the frequency analysis contains neither a component of up to 300 Hz nor a component of not less than 3400 Hz. The offset removal section 32 receives no offset removal execution signal from the FFT sections 20 and 21 and does not execute offset removal.

If the broad-band telephone sets are used at both the far end and the near end, both the sending-side FFT section 20 and the receiving-side FFT section 21 output the offset removal execution signal to the offset removal section 22, and offset removal as in the first embodiment is not executed.

The sending-side FFT section 20 can judge the receiving-side FFT section 21 just once immediately after the channel is connected and may wait later until the channel is re-connected. A continuous (both contiguous and intermittent) judgment may be made after the initial judgment.

According to the second embodiment, since the types of telephones used at the far end and the near end are checked, and whether the offset removal of the tap coefficient is executed is determined by the combination of the types of telephone sets used at the far end and the near end, unnecessary operations can be avoided, the scale of operation of the digital signal processor (software processing entity) can be reduced, decreasing the power consumption, or the hardware scale can be reduced.

(C) Third Embodiment

Figure 6:
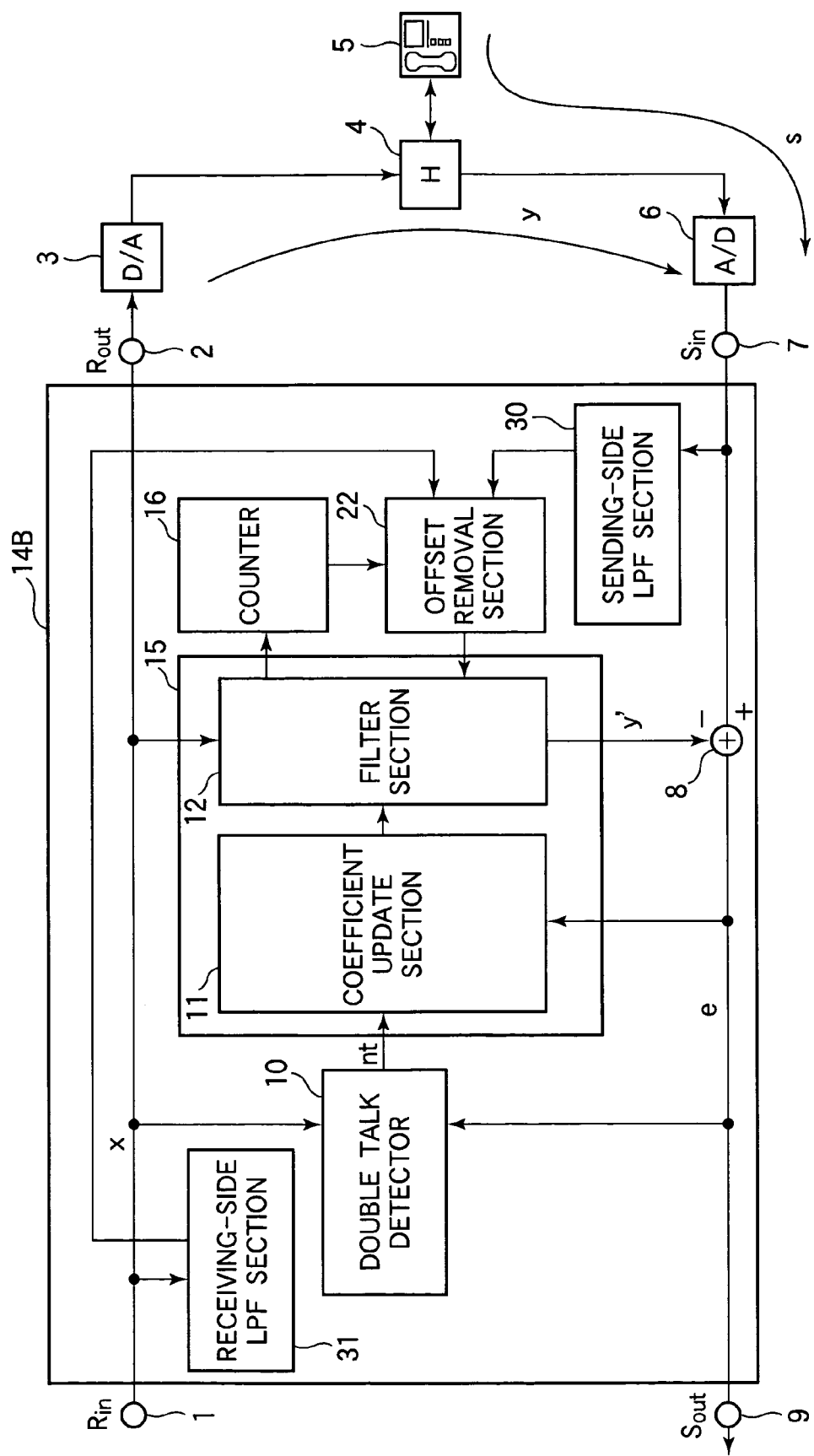
FIG. 6 is a block diagram showing a configuration of an echo canceller of the third embodiment.

An echo canceller for removing a line echo according to a third embodiment of the present invention will next be described in detail with reference to drawings. FIG. 6 is a block diagram showing a configuration of an echo canceller 14B of the third embodiment and a peripheral configuration. The elements identical to the elements shown in FIG. 5 of the second embodiment described above are referenced by the same reference marks.

As a comparison between FIG. 6 and FIG. 5 clearly shows, the third embodiment differs from the second embodiment in that the receiving-side FFT section 21 is replaced by the receiving-side low-pass filter section 31 and that the sending-side FFT section 20 is replaced by the sending-side low-pass filter section 30.

The sending-side low-pass filter section 30 and the receiving-side low-pass filter section 31 individually detect whether the supplied signal contains a component of up to 300 Hz (by detecting whether a level obtained as a result of low-pass filtering exceeds a level of −30 dBm). If a component of up to 300 Hz is detected, an offset removal execution signal is output to the offset removal section 22.

The relationship between the combination of the types of telephones used at the far end and the near end and whether the offset removal section 22 executes offset removal of the tap coefficient is the same as in the second embodiment.

In the second embodiment described earlier, a frequency analysis by the FFT section is used to determine the type of the telephone set. It is known that the FFT analyzes all the frequency range from the low-frequency band-to the high-frequency band, depending on the number of FFT window length samples. If a sampling frequency of 16000 Hz is used and 256 FFT window lengths are specified, positive frequency components of 62.5 Hz to 8000 Hz (or 0 Hz to 7937.5 Hz) are equally calculated. However, an offset important for the echo canceller is just in the very low frequency region. Therefore, detecting just the low-frequency component and controlling offset removal in accordance with the detected result is preferable in terms of saving the amounts of operations by the processor in digital signal processing and saving power. Accordingly, the third embodiment uses a low-pass filter section instead of the FFT section.

The third embodiment has the same effects as the second embodiment in controlling offset removal in accordance with a combination of types of telephone sets, and can also save greater amounts of unnecessary operations.

(D) Fourth Embodiment

Figure 7:
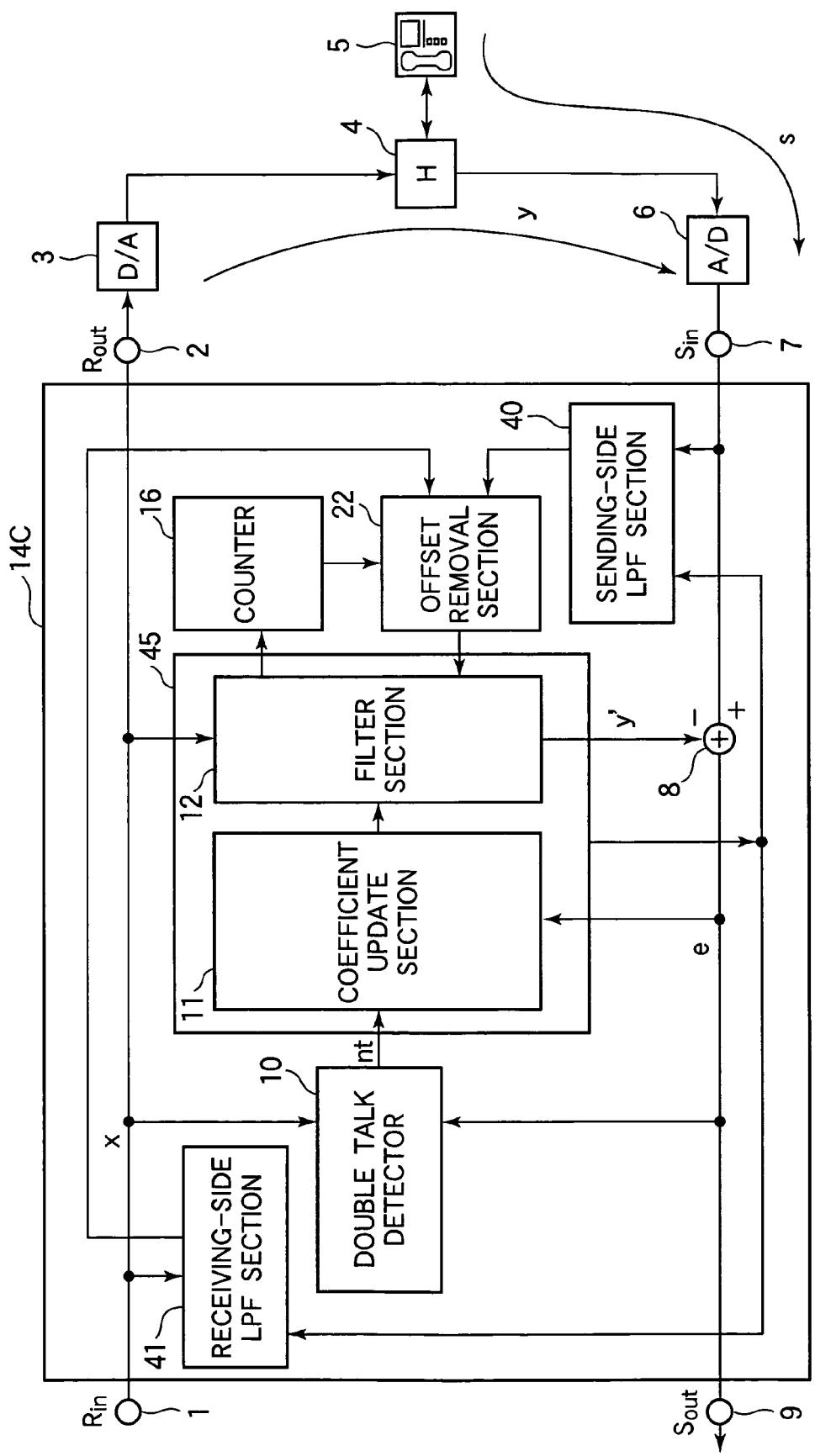
FIG. 7 is a block diagram showing a configuration of an echo canceller of the fourth embodiment.

An echo canceller for removing the line echo according to the fourth embodiment of the present invention will next be described in detail with reference to drawings. FIG. 7 is a block diagram showing a configuration of an echo canceller 14C of the fourth embodiment and peripheral elements. The elements identical to the elements shown in FIG. 6 of the third embodiment described above are denoted by the same reference marks.

The fourth embodiment is the same as the third embodiment in that the sending-side low-pass filter section 40 and the receiving-side low-pass filter section 41 are provided. The fourth embodiment differs from the third embodiment in that a low-pass filter in the sending-side low-pass filter section 40 and the receiving-side low-pass filter section 41 are variable low-pass filters and the low-frequency component for determining whether to execute offset removal can be varied. An adaptive filter 45 outputs information for determining the low-frequency component of the sending-side low-pass filter section 40 and the receiving-side low-pass filter section 41.

The reason why the sending-side low-pass filter section 40 and the receiving-side low-pass filter section 41 use the variable configuration is as follows.

In the fourth embodiment, the amounts of operations of the low-pass filter are smaller than those in the third embodiment, so that the actual device can be set up easily, and the frequency of the low-pass filter is specified automatically.

In the third embodiment, a threshold level of 300 Hz is used to detect a low-frequency component, and whether to execute offset removal is determined accordingly. This determination method is useful for general telephone lines. If an independent private line is provided, the lowest allowable frequency of the line may not be 300 Hz, and the third embodiment may not be able to be applied. In this case, the cutoff frequency of the low-pass filter of the third embodiment must be changed. On the other hand, the tap length of the filter section 12 of the echo canceller must be changed in accordance with the hybrid circuit 4 (a type of the exchange device, and a distance to the hybrid circuit).

That is, the low frequency that can be represented by the echo canceller depends also on the tap length of the echo canceller. As has been described above, the performance of the echo canceller will be degraded by the low-frequency component when there is a low-frequency component that cannot be expressed by the tap length of the filter section specified in the echo canceller. The fourth embodiment is provided to correctly remove the offset as described below, irrespective of the value of low frequency allowed by the line or the filter tap length of the echo canceller.

In the fourth embodiment, whether a frequency cannot be expressed by the filter section 12 of the echo canceller is detected as described later by using a tap length as a parameter (see expression (8)). Accordingly, in the fourth embodiment, the echo cancellation capability is secured by detecting whether any frequency cannot be represented automatically by a specified tap length even if the tap length of the echo canceller is changed and allowing optimum offset removal to be executed.

A person such as a designer specifies the tap length L of the filter section 12 of the adaptive filter 45. As mentioned above, the designer can specify the tap length appropriately in consideration of the hybrid circuit 4. For example, a tap length of 256 can be used, but another appropriate setting can also be used. The adaptive filter 45 outputs the tap length L to the sending-side low-pass filter section 40 and the receiving-side low-pass filter section 41.

In the sending-side low-pass filter section 40, the lower-limit frequency LF (Hz) depends on the tap length L, as calculated from expression (9). In expression (9), sf denotes a sampling frequency, which can be 1600 Hz, for example.

$$LF = sf/(L-1) \quad (9)$$

The sending-side low-pass filter section 40 passes a frequency lower than the lower-limit frequency LF obtained from expression (9). The receiving-side low-pass filter section 41 also obtains the lower-limit frequency LF from expression (9) and passes a frequency lower than the lower-limit frequency LF. The subsequent operation after the setting is the same as in the third embodiment, and it is not described here.

The fourth embodiment has the same effects as the third embodiment. Because the sending-side low-pass filter section and the receiving-side low-pass filter section change the lower-limit frequency LF (Hz) automatically, keeping up with the variable setting of the tap length L of the adaptive filter, so that the optimum offset removal can be automatically performed even if the tap length of the echo canceller is changed in accordance with the setup condition, and echo-free broad-band communication can be implemented.

(E) Other Embodiments

A variable low-pass filter is used in the fourth embodiment. A variable configuration may be adopted when FFT and other frequency analysis is used, and the lower-limit frequency LF (Hz) determined by the number of filter taps may be specified as a detection threshold.

In the second to fourth embodiments, an FFT section or a low-pass filter section is provided to process the frequency component of the received signal and the sending signal. An FFT section or a low-pass filter section for processing the frequency component of only the received signal may be provided to control the removal of the offset component of the tap coefficient.

The above mentioned embodiments have been described with the intention of applying them to broad-band VoIP communication. However, the present invention can be also applied to remove the echo caused by the offset component which is produced by an A/D converter as before in a call via a public switched network, not using the VoIP.

Further, in the embodiments described above, the echo canceller according to the present invention is used as an echo canceller for removing the line echo. The echo canceller can be also used to remove echo flowing from the microphone to the speaker.

Furthermore, in the embodiments described above, the offset of the tap coefficient is obtained by averaging all the tap coefficients at that time or by averaging the past tap coefficients. A median value, a weighed mean, or another calculation method may be applied. The number n of past tap coefficients which are used to calculate the offset of the tap coefficient may be varied with the set value L of taps of the adaptive filter, for example.

The invention claimed is:

1. An echo canceller which removes a line echo occurring in a hybrid circuit used in broadband voice telephony comprising:
   an echo replica forming means for forming an echo replica signal from a far-end input signal by using an adaptive filter including a filter section and a coefficient update section;
   an echo cancellation means for removing an echo component in a near-end input signal by subtracting the echo replica signal from the near-end input signal; and an offset removal means for removing an offset component produced under an effect of low frequencies from the filter coefficient of the adaptive filter, wherein the offset removal means calculates a mean value, a weighed mean value, or a median value of the filter coefficients in a past predetermined period as an offset component for each filter coefficient, and removes the offset component from the filter coefficient of the adaptive filter.

2. The echo canceller according to claim 1, wherein the offset removal means removes the offset component once in a predetermined period.

3. The echo canceller according to claim 1, further comprising a frequency component detection means for detecting whether either or both of the far-end input signal and the near-end input signal contain a low-frequency component lower than a predetermined frequency, wherein the offset removal means removes the offset component when the frequency component detection means detects that a low-frequency component is contained.

4. The echo canceller according to claim 3, wherein the frequency component detection means sets the predetermined frequency to a value obtained by an equation $sf/(L-1)$, where sf denotes a sampling frequency of the far-end input signal, the near-end input signal, or both, and L denotes a set value of the tap length of the adaptive filter.

* * * * *